US005731361A

United States Patent [19]
Horn et al.

[11] Patent Number: 5,731,361
[45] Date of Patent: Mar. 24, 1998

[54] PRODUCTION OF CHLOROFLUOROCARBON-FREE, URETHANE-CONTAINING MOLDINGS HAVING A CELLULAR CORE AND AN INTEGRAL SKIN

[75] Inventors: Peter Horn, Heidelberg; Walter Denzinger, Speyer; Harald Fuchs, Lorsch; Ralf Böhme, Ludwigshafen, all of Germany

[73] Assignee: BASF Aktiengesellschaft, Ludwigshafen, Germany

[21] Appl. No.: 529,780

[22] Filed: Sep. 18, 1995

[30] Foreign Application Priority Data

Sep. 28, 1994 [DE] Germany ............... 44 34 604.2

[51] Int. Cl.⁶ .................................................. C08J 9/34
[52] U.S. Cl. .................................. 521/137; 521/51
[58] Field of Search ......................... 521/51, 137

[56] References Cited

U.S. PATENT DOCUMENTS

| Re. 29,118 | 1/1977 | Stamberger | 521/137 |
|---|---|---|---|
| 3,824,199 | 7/1974 | Nadeau et al. | 521/51 |
| 4,198,488 | 4/1980 | Drake et al. | 521/137 |
| 4,721,733 | 1/1988 | Gastinzer et al. | 521/157 |
| 4,882,363 | 11/1989 | Neuhaus | 521/122 |
| 5,110,834 | 5/1992 | Horn et al. | 521/52 |
| 5,124,369 | 6/1992 | Vandichel et al. | 521/155 |
| 5,189,068 | 2/1993 | Boehme et al. | 521/51 |
| 5,254,597 | 10/1993 | Horn et al. | 521/51 |
| 5,470,930 | 11/1995 | Toba et al. | 526/204 |

FOREIGN PATENT DOCUMENTS

| 2000019 | 4/1990 | Canada . |
|---|---|---|
| A0358282 | 3/1990 | European Pat. Off. . |
| 0364854 | 4/1990 | European Pat. Off. . |
| 0463479 | 6/1991 | European Pat. Off. . |
| A0482476 | 4/1992 | European Pat. Off. . |
| A0513573 | 11/1992 | European Pat. Off. . |
| 0545175 | 6/1993 | European Pat. Off. . |
| A1804362 | 5/1970 | Germany . |
| B1769886 | 2/1971 | Germany . |
| C1955891 | 5/1971 | Germany . |
| A1694138 | 6/1982 | Germany . |
| A0319866 | 6/1989 | Germany . |
| 4203754 | 8/1993 | Germany . |
| 1209243 | 10/1970 | United Kingdom . |
| 1285224 | 8/1972 | United Kingdom . |
| 1321679 | 6/1973 | United Kingdom . |

OTHER PUBLICATIONS

EPO Search Report dated Jun. 20, 1996 and Translation of Same EPO Search Report, for 94 DE434604.

*Primary Examiner*—Rachel Gorr
*Attorney, Agent, or Firm*—Fernando A. Borrego

[57] ABSTRACT

Chlorofluorocarbon-free, urethane-containing moldings having a cellular core and an integral skin with an essentially pore-free surface, ie. polyurethane (PU) integral foams, are produced by reacting the conventional starting components in the presence of blowing agents, catalysts and at least one additive selected from the group consisting of the partially or completely neutralized (1) homopolymers of monoethylenically unsaturated monocarboxylic acids, dicarboxylic acids or the internal anhydrides thereof, (2) copolymers of
  (2i) monoethylenically unsaturated monocarboxylic acids, dicarboxylic acids or the internal anhydrides thereof and
  (2ii) carboxyl-free, monoethylenically unsaturated monomers copolymerizable with (2i) and (3) copolymers or graft copolymers of
  (3i) monoethylenically unsaturated monocarboxylic acids and/or their salts,
  (3ii) monoethylenically unsaturated dicarboxylic acids, their salts and/or their internal anhydrides and
  (3iii) if required, carboxyl-free, monoethylenically unsaturated monomers copolymerizable with (3i) and (3ii)

in a closed mold with compaction.

13 Claims, No Drawings

PRODUCTION OF CHLOROFLUOROCARBON-FREE, URETHANE-CONTAINING MOLDINGS HAVING A CELLULAR CORE AND AN INTEGRAL SKIN

The present invention relates to a process for the production of chlorofluorocarbon-free, urethane-containing moldings having a cellular core and an integral skin with an essentially pore-free surface, ie. polyurethane (PU) integral foams, by reacting a) organic and/or modified organic polyisocyanates with b) at least one relatively high molecular weight compound having at least two reactive hydrogen atoms, advantageously di- to octafunctional polyhydroxy compounds having molecular weights of from 400 to 8500, and, if required, c) low molecular weight chain extenders and/or crosslinking agents in the presence of d) blowing agents, e) catalysts and f) at least one additive (f) selected from the group consisting of the partially or completely neutralized f1) homopolymers of monoethylenically unsaturated monocarboxylic acids, dicarboxylic acids or the internal anhydrides thereof, f2) copolymers of f2i) monoethylenically unsaturated monocarboxylic acids, dicarboxylic acids or the internal anhydrides thereof and f2ii) carboxyl-free, monoethylenically unsaturated monomers copolymerizable with (f2i) and f3) copolymers or graft copolymers of (f3i) monoethylenically unsaturated monocarboxylic acids and/or their salts, (f3ii) monoethylenically unsaturated dicarboxylic acids, their salts and/or their internal anhydrides and (f3iii) if required, carboxyl-free, monoethylenically unsaturated monomers copolymerizable with (f3i) and (f3ii)

in a closed mold with compaction.

The production of moldings having a cellular core and an integral skin by reacting organic polyisocyanates, relatively high molecular weight compounds having at least two reactive hydrogen atoms and, if required, chain extenders and/or crosslinking agents in the presence of blowing agents, preferably physical blowing agents, catalysts, assistants and/or additives in a closed, unheated or heated mold has long been known and is described, for example, in DE-A-16 94 138 (GB 1 209 243), DE-C-19 55 891 (GB 1 321 679) and DE-B-17 69 886 (U.S. Pat. No. 3,824,199).

A summary of such moldings, ie. polyurethane integral foams, was published, for example, in Kunststoff-Handbuch, Volume 7, Polyurethane, edited by Dr. G. Oertel, Carl-Hanser-Verlag, Munich, Vienna, 2nd Edition, 1983, pages 333 et seq. and in Integral-schaumstoffe by Dr. H. Piechota and Dr. H. Röhr, Carl-Hanser-Verlag, Munich, Vienna, 1975.

Although the production of PU integral foe moldings has become extremely important industrially, the processes described have deficiencies owing to the increased environmental consciousness with regard to the blowing agents used. The blowing agents used worldwide on a large scale are fluorochloroalkanes, preferably trichlorofluoromethane, which initially evaporate under the influence of the exothermic polyaddition reaction, then partially condense under higher pressure on the cooler inner surface of the mold and are incorporated in the molding. The only disadvantage of these blowing agents is the environmental pollution, since they are thought to be involved in the degradation of the ozone layer in the stratosphere.

In order to reduce the amount of fluorochloroalkanes, the blowing agent predominantly used is water, which reacts with the polyisocyanate with evolution of carbon dioxide, which acts as the actual blowing agent. The disadvantage of this process is that the carbon dioxide formed is not condensed on the inner mold surface under the reaction conditions prevailing in the mold and thus leads to the formation of moldings having a pore-containing surface.

According to DE-A-1 804 362 (GB 1 285 224), PU foams having a compact surface and a cellular core can be produced with the concomitant use of alkali metal aluminum silicates having a zeolite structure. The blowing agents used are in particular halohydrocarbons or mixtures of halohydrocarbons and partially hydrated alkali metal aluminum silicates or organic compounds containing water of hydration. As a result of the addition of water and the alkali menal aluminum silicates, nonshrink PU integral foam moldings having overall densities of up to 120 g/l were said to be produced in spite of the concomitant use of chlorofluorocarbons.

Chlorofluorocarbon-free, rigid PU foam moldings having high surface hardness and a bulk density of at least 300 kg/m$^3$ are described in EP-A-0 319 866 (U.S. Pat. No. 4,882,363). They are prepared using polyhydroxy compounds or a mixture of organic polyhydroxy compounds, having an average hydroxyl functionality of at least 2.2 and an average hydroxyl number of at least 300 mg KOH/g, water and/or carbon dioxide as blowing agents and, as additives, zeolite absorbants having a diameter of the pore opening into the absorption cavities of at least 0.7 nm.

A process for the production of reallient, flexible polyurethane moldings having a cellalar core and compact skin by the RIM mathod is descrived in EP-A-0 482 476 (U.S. Pat. No. 5,110,834). The additives used are crystalline, microporous molecular sieves and/or cristalline silica. Although this process gives moldings having good mechanical properties and an essentially pore-free, smooth surface, the process also has disadvantages. For example, the difficult and technically complicated preparation of the microporous, cristalline molecular sieves and of the silica and the considerable amount of additives which has to be incorporated into the polyurethane formulation in order to obtain polyurethane moldings having the desired compact skin and an essentially pore-free surface are disadvantageous.

According to EP-A-0 513 573, amorphous, microporous silica gels may be used as additives for the production of the flexible an resilient, semirigid or rigid polyurethane moldings having an integral density distribution and an essentially pore-free, smooth surface. Although the moldings produced have exellent mechanical properties, their preparation on a large scale currently presents carcain difficulties with regard to the constancy of the bulk density and of the catalysis.

Processes for the production of flexible and resilient, semirigid or rigid PU moldings having an integral density distribution and an essentially pure-free, smooth surface are furthermore described in EP-A-0 545 175 (U.S. Pat. No. 5,254,597) and EP-A-0,364,854 (CA-A-2 000 019). Since microporous active carbon and /or microporous carbon molecular sieves may be used as additives in the process according to EP-A-0 545 175, only black moldings can be produced, on the other hand, the disadvantage of the process according to EP-A-0 364 854 is the use of flammable (cyclo)-alkanes of 4 to 8 carbon atoms as blowing agents, which make it necessary to produce the moldings in expensive explosion-proofed rooms.

Furthermore, according to DE-A-42 03 754, the use of acetone as a blowing agent requires explosion-proofed rooms for the processing of the acetone-containing, expandable reaction mixture. Another disadvantage is that, when acetone/water mixtures are used as blowing agents, particularly in the production of low-density rigid PU integral foam moldings, the formation of the surface of the molding does not always meet the requirements with regard to their industrial use. For certain industrial applications of the moldings, this disadvantage furthermore cannot be completely eliminated by using tertiary alcohols, with or without water, as blowing agents according to EP-A-0 463 479 (U.S. Pat. No. 5,189,068).

It is an object of the present invention at least to reduce or if possible completely eliminate the abovementioned disadvantages of the known processes and to provide an improved process for the production of urethane-containing moldings having an essentially pore-free smooth surface, which preferably consist of semirigid or in particular rigid PU integral foams. Suitable PU formulations containing fillers, which may have a reinforcing effect, for the production of said foams should be easy to handle, free-flowing and readily processable by the RIM or low-pressure method, even in the absence of chlorofluorocarbons (CFC) which act as diluents.

We have found that this object is achieved, surprisingly, by the concomitant use of specific homopolymers and/or copolymers and/or graft copolymers of ethylenically unsaturated carboxylic acids or carboxylic acid derivatives as additives for the production of the PU integral foam moldings.

The present invention thus relates to a process for the production of CFC-free, urethane-containing moldings having a cellular core and an integral skin by reacting a) organic polyisocyanates, modified organic polyisocyanates or mixtures of organic and modified organic polyisocyanates with b) at least one relatively high molecular weight compound having at least two reactive hydrogen atoms, preferably relatively high molecular weight polyhydroxy compounds and, if required, c) low molecular weight chain extenders, crosslinking agents or mixtures of chain extenders and crosslinking agents in the presence of d) blowing agents, e) catalysts and f) at least one additive in a closed mold with compaction, wherein the additive (f) is selected from the group consisting of the f1) homopolymers which are partially or completely neutralized and are obtainable by polymerization of monoethylenically unsaturated monocarboxylic acids, dicarboxylic acids or their salts or internal andrides f2) copolymers which are partially or completely neutralized and are obtainable by copolymerization of
        f2i) monoethylenically unsaturated monocarboxylic acids, dicarboxylic acids or their salts or internal anhydrides and
        f2ii) carboxyl-free, monoethylenically unsaturated monomers copolymerizable with (f2i) and f3) copolymers or graft copolymers which are partially or completely neutralized and are obtainable by copolymerization or graft copolymerization of
        (f3i) monoethylenically unsaturated monocarboxylic acids or their salts or mixtures thereof,
        (f3ii) monoethylenically unsaturated dicarboxylic acids, their salts or their internal anhydrides or mixtures of at least two of the stated monomers (f3ii) and
        (f3iii) if required, at least one carboxyl-free, monoethylenically unsaturated monomer copolymerizable with (f3i) and (f3ii).

As a result of the addition of the homopolymers (f1) and/or copolymers (f2) and/or (graft) copolymers (f3) which can be used according to the invention and are obtained from monoethylenically unsaturated carboxylic acids and, if required, carboxyl-free, copolymerizable, monoethylenically unsaturated monomers, in combination with known blowing agents, for example the abovementioned (cyclo) alkanes and/or in particular water, PU integral foams, preferably semirigid and rigid PU integral foams, advantageously those having relatively low overall densities of, for example, from 200 to 300 kg/m$^3$ and a pronounced skin, excellent surface and outstanding mechanical properties, can be produced in the absence of chlorofluorocarbons. Another advantage is the good processability of expandable reaction mixtures containing reinforcing fillers. Reinforcing agents, for example carbon black, wollastonite, short glass fibers, natural fibers, glass beads, etc., can, for example, be incorporated into the reaction mixture or the mold can be loaded with mats or surface mats of glass fibers, natural fibers or synethetic fibers or rovings of such materials without the smooth surface of the PU integral foam molding being damaged as a result. PU integral foam composites produced in this manner open up completely new applications, for example in vehicle technology, for example aircraft construction, automotive construction, shipbuilding and railway car construction, in the furniture industry and in apparatus construction.

The starting materials (a) to (f) known per se, in combination with the homopolymers (f1) and copolymers (f2) and (f3) and graft copolymers (f3) as additive (f) which can be used according to the invention, can be processed for the production of the CFC-free PU integral foam moldings by the novel process. Specifically, the following may be stated with regard to the starting materials which can be advantageously used:

a) Suitable organic polyisocyanates (a) are aliphatic, cycloaliphatic and, preferably, aromatic polyfunctional isocyanates.

Specific examples are alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, 2-butyl-2-ethylpentamethylene 1,5-diisocyanate, tetramethylene 1,4-diisocyanate and preferably hexamethylene 1,6-diisocyanate; cycloaliphatic diisocyanates, such as cyclohexane 1,3- and -1,4-diisocyanate and any mixtures of these isomers, 1-isocyanato-3,3,5-trimethyl-5-isocyanatomethylcyclohexane (isophorone diisocyanate), hexahydrotoluylene 2,4- and 2,6-diisocyanate and the corresponding isomer mixtures, dicyclohexylmethane 4,4'-, 2,2'- and 2,4'-diisocyanate and the corresponding isomer mixtures, araliphatic diisocyanates, such as xylylene 1,4-diisocyanate and xylylene diisocyanate isomer mixtures, and preferably aromatic di- and polyisocyanates, such as toluylene 2,4- and 2,6-diisocyanate and the corresponding isomer mixtures, diphenylmethane 4,4'-, 2,4'- and 2,2'-diisocyanate and the corresponding isomer mixtures and mixtures of diphenylmethane 4,4'- and 2,4'- and, if required, 2,2'-diisocyanates, polyphenylpolymethylene polyisocanates, mixtures of diphenylmethane 4,4'-, 2,4'- and 2,2'-diisocyanates and polyphenylpolymethylene polyisocyanates (crude MDI) and mixtures of crude MDI and toluylene diisocyanates. The organic di- and polyisocyanates may be used individually or in the form of mixtures.

Modified polyfunctional isocyanates, ie. products which are obtained by chemical reaction of organic di- and/or polyisocyanates, are frequently also used. Examples are di- and/or polyisocyanates containing ester, urea, biuret, allophanate, carbodiimide, isocyanurate, uretdione and/or urethane groups. Specific examples are organic, preferably aromatic, polyisocyanates containing urethane groups and having NCO contents of from 33.6 to 15, preferably from 31 to 21, % by weight, based on the total weight, for example diphenyimethane 4,4'-diisocyanate or toluylene 2,4- and/or 2,6-diisocyanate modified with low molecular weight diols, triols, dialkylene glycols, trialkylene glycols or polyoxyalkylene glycols having molecular weights of up to 4200, examples of di- or polyoxyalkylene glycols, which may be used individually or as mixtures, being diethylene, dipropylene, polyoxyethylene, polyoxypropylene and polyoxypropylene polyoxyethylene glycols. Also suitable are NCO-containing prepolymers having NCO contents of from 25 to 3.5, preferably from 21 to 14, % by weight, based on the total weight, prepared from the polyester polyols and/or preferably polyether polyols described below and diphenylmethane 4,4'-diisocyanate, mixtures of diphenylmethane 2,4'- and 4,4'-diisocyanate, toluylene 2,4- and/or 2,6-diisocyanates or crude MDI. Liquid polyisocyanates containing carbodiimide groups and/or isocyanurate rings and having NCO contents of from 33.6 to 15, preferably from 31 to 21, % by weight, based on the total weight, for example those based on diphenylmethane 4,4'-, 2,4'- and/or 2,2'-diisocyanate and/or toluene 2,4- and/or 2,6-diisocyanate have also proven suitable.

The modified polyisocyanates may, if required, be mixed with one another or with unmodified organic polyisocyanates, such as diphenylmethane 2,4'- or 4,4'-diisocyanate, crude MDI, toluylene 2,4-diisocyanate and/or toluylene 2,6-diisocyanate. For example, mixtures of urethane-modified diphenylmethane diisocyanates and toluylene diisocyanates and/or crude MDI are very suitable.

The following have proven particularly suitable as organic polyisocyanates and are therefore preferably used for the preparation of the flexible and resilient or semirigid polyurethane integral foam moldings:

NCO-containing prepolymers having an NCO content of from 25 to 9% by weight, in particular those based on polyether polyols or polyester polyols and one or more diphenylmethane diisocyanate isomers, advantageously diphenylmethane 4,4'-diisocyanate, and/or modified organic polyisocyanates containing urethane groups and having an NCO content of from 33.6 to 15% by weight, in particular those based on diphenylmethane 4,4'-diisocyanate or diphenylmethane diisocyanate isomer mixtures, mixtures of toluylene 2,4- and 2,6-diisocyanates, mixtures of toluylene diisocyanates and crude MDI or in particular mixtures of the abovementioned prepolymers based on diphenylmethane diisocyanate isomers and crude MDI. The aromatic polyisocyanates, modified aromatic polyisocyanates or polyisocyanatemixtures advantageously have an average functionality of from 2 to 2.6, preferably from 2 to 2.4. Aromatic polyisocyanates modified with urethane groups and having a functionality greater than 2.6, advantageously from 2.8 to 3.5, in particular crude MDI, are preferably used for the production of the rigid polyurethane integral foam moldings.

If moldings having a light-stable surface are required for special applications, for example for interior trim in means of transport, they are preferably produced using aliphatic or cycloaliphatic polyisocyanates, in particular modified polyisocyanates based on hexamethylene-1,6-diisocyanate or isophorone diisocyanate or mixtures of the stated diisocyanates with or without diphenylmethane diisocyanate isomers and/or toluylene diisocyanate isomers.

b) Advantageously, compounds having a functionality of from 2 to 8 and a molecular weight of from 400 to 8500 are used as relatively high molecular weight compounds (b) having at least two reactive hydrogen atoms, the relatively high molecular weight compounds (b) having a functionality of, preferably, from 2 to 3, in particular from 2.0 to 2.6, and a molecular weight of, preferably, from 1800 to 6000, in particular from 2000 to 5000, for the production of flexible and resilient as well as semirigid polyurethane integral foam moldings, and those having a functionality of, preferably, from 3 to 8, in particular from 3 to 6, and a molecular weight of, preferably, from 400 to 3200, in particular from 600 to 2400, being used for the production of rigid polyurethane integral foam moldings. Polyhydroxy compounds having the abovementioned functionalities and molecular weights and selected from the group consisting of the polyether polyols, polyester polyols, polythioether polyols, hydroxy-containing polyesteramides, hydroxyl-containing polyacetals, hydroxyl-containing aliphatic polycarbonates and polymer-modified polyether polyols or mixtures of at least two of the stated polyhydroxy compounds have proven particularly suitable. Polyester polyols and/or in particular polyether polyols are preferably used.

Particularly preferred relatively high molecular weight compounds (b) are mixtures of polyhydroxy compounds, preferably polyether polyols, having a molecular weight of from 400 to 8500, which contain at least one difunctional polyhydroxy compound, preferably one difunctional polyether polyol and at least one tri- to octafunctional polyhydroxy compound, preferably one tri- to octafunctional polyether polyol, the mixture advantageously containing from 5 to 40, preferably from 15 to 30, % by weight, based on the total weight of the mixture, of the difunctional polyhydroxy compound in order to obtain an optimum surface of the molding. Preferably used difunctional polyhydroxy compounds of this type are, for example, polyoxypropylene glycols or polyoxypropylene polyoxyethylene glycols having molecular weights, for example, from 400 to 2200, polytetramethylene glycols having molecular weights of, for example, from 400 to 4000, polyesterdiols, for example polycaprolactones or polyoxytetramethylene carbonates, having molecular weights of, for example, from 1000 to 4000, and polybutadienediols having molecular weights of, for example, from 1800 to 3000.

Other relatively high molecular weight compounds (b) which may be used are polyoxyalkylenepolyamines, advantageously polyoxyalkylenediamines and/or polyoxyalkylenetriamines having the abovementioned molecular weights or mixtures of such polyoxyalkylenepolyamines and polyhydroxy compounds, preferably polyether polyols.

Suitable polyester polyols can be prepared, for example, from organic dicarboxylic acids of 2 to 12 carbon atoms, preferably aliphatic dicarboxylic acids of 4 to 6 carbon atoms, and polyhydric alcohols, preferably diols, of 2 to 12, preferably 2 to 6, carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used both individually and as a mixture with one another. Instead of the free dicarboxylic acids, the corresponding dicarboxylic acid derivatives, for example mono- and/or diesters of dicarboxylic acids with alcohols of 1 to 4 carbon atoms or dicarboxylic anhydrides, may also be used. Dicarboxylic acid mixtures comprising succinic, glutaric and adipic acid in weight ratios of, for example, 20 to 35:35 to 50:20 to 32 are preferably used, adipic acid being particularly preferably used. Examples of dihydric and polyhydric alcohols, in particular diols and alkylene glycols, are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane and pentaerythritol. Ethanediol, diethylene glycol, 1,4-butanediol, 1,5-pentanediol, 1,6-hexanediol, glycerol or mixtures of at least two of the stated diols, in particular mixtures of 1,4-butanediol, 1,5-pentanediol and 1,6-hexanediol and/or glycerol, are preferably used. Polyester polyols obtained from lactones, eg. ε-caprolactone, or hydroxycarboxylic acids, eg. ω-hydroxycaproic acid, may also be used.

For the preparation of the polyester polyols, the organic, for example aromatic or preferably aliphatic, polycarboxylic acids and/or polycarboxylic acid derivatives and polyhydric alcohols can be subjected to polycondensation in the absence of a catalyst or, preferably, in the presence of an esterification catalyst, advantageously in an atmosphere comprising inert gases, eg. nitrogen, carbon monoxide, helium, argon, etc. in the melt at from 150° to 250° C., preferably from 180° to 220° C., if required under reduced pressure, until the desired acid number is reached, which is advantageously less than 10, preferably less than 2. In a preferred embodiment, the esterification mixture is subjected to polycondensation at the abovementioned temperatures under atmospheric pressure and subsequently under less than 500, preferably from 50 to 150, mbar until an acid number of from 80 to 30, preferably from 40 to 30, is reached. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entraining agents, for example benzene, toluene, xylene or chlorobenzene, for removing the condensation water by azeotropic distillation.

For the preparation of the polyesterpolyols, the organic polycarboxylic acids and/or polycarboxylic acid derivatives and polyhydric alcohols are advantageously subjected to polycondensation in a molar ratio of from 1:1 to 1:1.8, preferably from 1:1.05 to 1:1.2.

The polyesterpolyols obtained preferably have a functionality of from 2 to 3, in particular from 2 to 2.6, and a molecular weight of from 1200 to 3600, preferably from 1500 to 3000, in particular from 1800 to 2500.

However, polyhydroxy compounds which are particularly used are polyetherpolyols which are prepared by known processes, for example by anionic polymerization with alkali metal hydroxides, such as sodium hydroxide, potassium hydroxide, or alkali metal alcoholates, such as sodium methylate, sodium or potassium ethylate or potassium isopropylate, as catalysts and with the addition of at least one initiator which contains, bonded per molecule, from 2 to 8, preferably 2 or 3, reactive hydrogen atoms for polyether polyols for the production of the semirigid as well as flexible and resilient PU integral foam moldings and preferably from 3 to 8, in particular from 3 to 6, reactive hydrogen atoms for polyether polyols for the production of rigid PU integral foam moldings, or by cationic polymerization with Lewis acids, such as antimony pentachloride, boron fluoride etherate, etc. or bleaching earth as catalysts, from one or more alkylene oxides having 2 to 4 carbon atoms in the alkylene radical.

Examples of alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternately in succession or as mixtures. Examples of suitable initiator molecules are water, organic dicarboxylic acids, such as succinic acid, adipic acid, phthalic acid and terephthalic acid, aliphatic and aromatic, unsubstituted or N-mono- or N,N- or N,N'-dialkyl-substituted diamines where the alkyl radical is of 1 to 4 carbon atoms, such as unsubstituted or mono- or dialkyl-substituted ethylenediamine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-toluylenediamine and 4,4'-, 2,4'- and 2,2'-diaminodiphenylmethane.

Other suitable initiator molecules are alkanolamines, eg. ethanolamine, N-alkylalkanolamines, for example N-methyl- and N-ethylethanolamine, dialkanolamines, eg. diethanolamine, N-alkyldialkanolamines, for example N-methyl- and N-ethyldiethanolamine, and trialkanolamines, eg. triethanolamine, and ammonia. Polyhydric, in particular dihydric and/or trihydric, alcohols and/or dialkylene glycols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or mixtures of at least two polyhydric alcohols and, if required, additionally water are preferably used.

The polyether polyols, preferably polyoxypropylene polyols and polyoxypropylenepolyoxyethylene polyols, have, as stated above, a functionality of from 2 to 8 and molecular weights of from 400 to 8500, and suitable polyoxytetramethylene glycols have a molecular weight of about 4000, preferably from 600 to 2200.

Other suitable polyether polyols are polymer-modified polyether polyols, preferably graft polyether polyols, especially those based on styrene and/or acrylonitrile, which are prepared by in situ polymerization of acrylonitrile, styrene or, preferably, mixtures of styrene and acrylonitrile, for example in a weight ratio of from 90:10 to 10:90, preferably from 70:30 to 30:70, advantageously the abovementioned polyether polyols, similarly to German Patents 11 11 394, 12 22 669 (U.S. Pat. Nos. 3,304,273, 3,383,351, 3,523,093), 11 52 536 (GB 10 40 452) and 11 52 537 (GB 987 618), and polyether polyol emulsions which contain, as the disperse phase, usually in an amount of from 1 to 50, preferably from 2 to 25, % by weight, for example polyureas, polyhydrazines, polyurethanes containing bonded tertiary amino groups and/or melamine and which are described, for example, in EP-B-011 752 (U.S. Pat. No. 4,304,708), U.S. Pat. No. 4,374,209 and DE-A-32 31 497.

As in the case of the polyester polyols, the polyether polyols may be used individually or in the form of mixtures, mixtures of difunctional and at least trifunctional polyether polyols or polyester polyols being preferred. They may also be mixed with the polymer-modified polyether polyols or polyester polyols and with the hydroxyl-containing polyesteramides, polyacetals, polycarbonates and/or polyoxyalkylene polyamines.

Examples of suitable hydroxyl-containing polyacetals are the compounds which can be prepared from glycols, such as diethylene glycol, triethylene glycol, 4,4'-dihydroxyethoxydiphenyldimethylmethane or hexandeiol, and formaldehyde. Suitable polyacetals can also be prepared by polymerization of cyclic acetals.

Suitable hydroxyl-containing polycarbonates are those of the type known per se, which, for example, can be prepared by reacting diols, such as 1,3-propanediol, 1,4-butanediol and/or 1,6-hexanediol, diethylene glycol, trioxyethylene glycol or tetraoxyethylene glycol, with diaryl carbonates, eg. diphenyl carbonate or phosgene.

The hydroxyl-containing polyesteramides include, for example, the predominantly linear condensates obtained from polybasic, saturated and/or unsaturated carboxylic acids and the anhydrides thereof and polyhydric saturated and/or unsaturated aminoalcohols or mixtures of polyhydric alcohols and amino-alcohols and/or polyamines.

Suitable polyetherpolyamines can be prepared from the abovementioned polyetherpolyols by known processes. Examples are the cyanoalkylation of polyoxyalkylene polyols and subsequent hydrogenation of the resulting nitrile (U.S. Pat. No. 3,267,050) or the partial or complete amination of polyoxyalkylene polyols with amines or ammonia in the presence of hydrogen and catalysts (DE-A-12 15 373).

The flexible and resilient and preferably semirigid or rigid moldings containing the urethane groups and having an integral skin and cellular core can be prepared in the presence of absence of chain extenders and/or crosslinking agents (c). However, the addition of chain extenders, crosslinking agents or, if required, mixtures thereof may prove to be advantageous for modifying the mechanical properties, for example the hardness. Examples of chain extenders and/or crosslinking agents used are low molecular weight, polyhydric alcohols, preferably diols and/or triols, having molecular weights of less than 400, preferably from 60 to 300. Suitable chain extenders are, for example, aliphatic, cycloaliphatic and/or araliphatic diols, such as alkanediols and/or dialkylene glycol, of 2 to 14, preferably 4 to 10, carbon atoms, eg. ethylene glycol, 1,3-propanediol, 1,10-decanediol, o-, m- and p-dihydroxycyclohexane, diethylene glycol, triethylene glycol, dipropylene glycol, tripropylene glycol and preferably 1,3-butanediol, 1,4-butanediol, 1,6-hexanediol and bis(2-hydroxyethyl)hydroquinone, and suitable crosslinking agents are, for example, triols, eg. 1,2,4- and 1,3,5-trihydroxypropane, cyclohexane, trimethylolethane, glycerol and trimethylolpropane and tetrahydric to octahydric alcohols, such as pentaerythritol, sorbitol and sucrose, and low molecular weight hydroxyl-containing polyalkylene oxides, for example having molecular weights of up to 400 and based on ethylene oxide and/or 1,2-propylene oxide and the initiator molecules stated above for the polyetherpolyol preparation.

Other suitable chain extenders are N,N'-dialkyl-substituted, aromatic diamines which may be substituted in the aromatic radical by alkyl groups and have 1 to 20, preferably 1 to 4, carbon atoms in the N-alkyl radical, for example N,N'-diethyl-, N,N'-di-sec-pentyl-, N,N'-di-sec-hexyl-, N,N'-dicyclohexyl-p- or -m-phenylenediamine, N,N'-dimethyl-, N,N'-diethyl-, N,N'-diisopropyl-, N,N'-di-sec-butyl- and N,N'-dicyclohexyl-4,4'-diaminodiphenylmethane and N,N'-di-sec-butylbenzidine.

Other suitable chain extenders or crosslinking agents are polyoxyalkylene polyols having a functionality of from 2 to 4 and a molecular weight of up to 400, which are prepared by subjecting ethylene oxide, 1,2-propylene oxide or a mixture of ethylene oxide and 1,2-propylene oxide to a polyaddition reaction with at least one initiator molecule of the formula

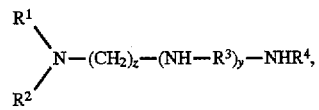

where

R$^1$ and R$^2$ are identical or different and are linear or branched C$_1$–C$_4$-alkyl, where the two radicals together form a C$_4$–C$_6$-cycloalkylene radical which may contain, instead of a methylene group, an —O— or —NR$^5$-bridge member in which R$^5$ is C$_1$–C$_4$-alkyl, or identical or different dialkylaminoalkyl radicals of the formula

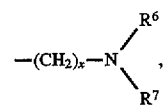

where R$^6$ and R$^7$ are identical or different, linear or branched C$_1$–C$_4$-alkyl radicals or the two radicals together form a C$_4$–C$_6$-cycloalkylene radical which, instead of a methylene, may contain an —O— or —NR$^5$-bridge member in bonded form and x is an integer of at least 3, z is an integer of at least 3, R$^3$ is C$_2$–C$_4$-alkylene, Y is zero or a number from 1 to 3 and R$^4$ is hydrogen or C$_1$–C$_4$-alkyl, with the proviso that, when y is zero, R$^4$ is hydrogen.

Initiator molecules of this type are, for example, N,N-dimethyl-1,3-diaminopropane, N,N-dimethyl-1,4-diaminobutane, N,N-dimethyldipropylenetriamine and N,N-di-tert-butyl-1,3-diaminopropane.

If the compounds of component (c) are concomitantly used, they may be employed in the form of mixtures or individually and are advantageously used in amounts of from 1 to 50, preferably from 3 to 40, parts by weight, based on 100 parts by weight of the relatively high molecular weight compounds (b).

d) A preferably used blowing agent (d) is water, which reacts with the organic, unmodified or modified polyisocyanates (a) with formation of carbon dioxide and amino groups, which in turn react further with polyisocyanates (a) to form urea groups and can thus influence the compressive strength of the PU integral foam moldings. Since, owing to the method of preparation, the homopolymers (f1), copolymers (f2) and (f3) and graft copolymers (f3) which can be used according to the invention as additives (f) may contain up to 20, preferably from 0.01 to 15, in particular from 0.5 to 12, % by weight, based on the total weight, of water, in many cases it is not necessary to add water to the components (b) and, if desired, (c) or to the reaction mixture. If, however, water has additionally to be incorporated in the polyurethane formulation in order to achieve the desired bulk density, water is usally used in amounts of from 0.05 to 5, preferably from 0.1 to 3, in particular from 0.1 to 1, % by weight, based on the weight of components (a) to (c).

Instead of water or preferably in combination with water and homopolymers (f1), copolymers (f2) and (f3) and graft copolymers (f3) which can be used according to the invention, low-boiling liquids which evaporate under the influence of the exothermic polyaddition reaction and advantageously have a boiling point of from −40° to 120° C., preferably from 10° to 90° C., under atmospheric pressure, or gases, may be used as additives (f) essential to the invention.

The liquids of the abovementioned type and gases which are suitable as blowing agents can be selected, for example, from the group consisting of the alkanes, eg. propane, n-butane, isobutane, n-pentane, isopentane, preferably the industrial pentane mixtures, cycloalkanes and cycloalkenes, eg. cyclobutane, cyclopentene, cyclohexene and preferably cyclopentane and/or cyclohexane, dialkyl ethers, eg. dimethyl ether, methyl ethyl ether, diethyl ether or tert-butyl methyl ether, cycloalkylene ethers, eg. furan, ketones, eg. acetone or methyl ethyl ketone, carboxylates, eg. ethyl acetate, methyl formate and tert-butyl ethyleneacrylate, tertiary alcohols, eg. tertiary butanol, carboxylic acids, eg. formic acid, acetic acid and propionic acid, fluoroalkanes which are degraded in the trophosphere and therefore do not harm the ozone layer, eg. trifluoromethane, difluoromethane, difluoroethane, tetrafluoroethane and heptafluoroethane and gases such as nitrogen, carbon monoxide and noble gases, eg. helium, neon and krypton.

Other suitable blowing agents are salts which undergo thermal decomposition, eg. ammonium bicarbonate and/or ammonium carbamate, or compounds which form in situ salts such as aqueous ammonia and/or amines and carbon dioxide, and ammonium salts of organic carboxylic acids, for example the monoammonium salts of malonic acid or boric acid.

The most advantageous amount of solid blowing agents, low-boiling liquids and gases, each of which may be used individually or in the form of mixtures, for example as liquid or gas mixtures or as gas/liquid mixtures, depends on the density which it is intended to achieve and on the amount of water and homopolymer (f1) and/or preferably copolymer (f2) and/or (graft) copolymer (f3) used. The required amount can be readily determined by simple small-scale tests. Usually, from 0.5 to 30, preferably from 2 to 15, parts by weight of solid, from 1 to 15, preferably from 3 to 12, parts by weight of liquid and/or from 0.01 to 80, preferably from 10 to 35, parts by weight of gas, based in each case on the weight of the components (a), (b) and, if required, (c), give satisfactory results. Loading with, for example, air, carbon dioxide, nitrogen and/or helium can be effected both via the relatively high molecular compounds (b) and, if required, low molecular weight chain extenders and/or crosslinking agents (c) and via the polyisocyanates (a) or via (a) and (b) and, if required, (c).

As stated above, perchlorofluorocarbons are not used as blowing agents.

e) In particular, compounds which greatly accelerate the reaction of the hydroxyl-containing compounds of component (b) and, if required, (c) with the organic, unmodified or modified polyisocyanates (a) are used as catalysts (e) for the production of the moldings having an integral skin and a cellular core. Organic metal compounds, preferably organic tin compounds, such as tin(II) salts of organic carboxylic acids, eg. tin(II) diacetate, tin(II) dioctoate, tin(II) diethylhexanoate and tin(II) dilaurate, and the dialkyltin(IV) salts of organic carboxylic acids, eg. dibutyltin diacetate, dibutyltin dilaurate, dibutyltin maleate and dioctyltin diacetate, are suitable. Dialkyltin (IV) mercapto compounds, eg. bislauryltin(IV) dimercaptide, and compounds of the general formula $R_2Sn(SR'$—$O$—$CO$—$R")_2$ or $R_2Sn(SR'$-$CO$-$OR")_2$, where R is an alkyl of at least 8 carbon atoms, R' is alkylene of at least 2 carbon atoms and R" is alkyl of at least 4 carbon atoms, have also proven suitable. Examples of catalysts of this type, which are described, for example, in DD-A-218 668, are dioctyltin-bis(thioethyleneglycol-2-ethylhexanoate), dioctyltin-bis(thioethyleneglycollaurate), dioctyltin-bis-(2-ethylhexyl thiolatoacetate), dioctyltin-bis(hexyl thiolatoacetate) and dioctyltin-bis(lauryl thiolatoacetate). Organotin compounds having tin-oxygen or tin-sulfur bonds, as described, for example, in DD-A-255 535, of the general formulae $(R_3Sn)_2O$, $R_2SnS$, $(R_3Sn)_2S$, $R_2Sn(SR')_2$ or $RSn(SR')_3$, where R is alkyl of 4 to 8 carbon atoms and R' is alkyl of 4 to 12 carbon atoms and R' may furthermore be —R'COOR''' or —R'OCOR''', in which R''' is alkyl of 1 to 6 carbon atoms and R' is alkylene of 4 to 12 carbon atoms, have also proven very suitable catalysts. Examples of these are bis(tributyltin) oxide, dibutyltin sulfide, dioctyltin sulfide, bis(tributyltin) sulfide, dibutyltin-bis(2-ethylhexyl thioglycolate), dioctyltin-bis(2-ethylhexyl thioglycolate), octyltin-tris(2-ethylhexyl thioglycolate), dioctyltin-bis-(thioethyleneglycol-2-ethylhexanoate) and dibutyltin-bis-(thioethyleneglycollaurate).

The organic metal compounds can be used individually as catalysts or in the form of catalyst combinations. A combination which consists of 94% by weight of di-n-octyltin-bis (2-eth-ylhexylthioglycolate) and 6% by weight of mono-n-octyltintris(2-ethylhexylthioglycolate) has proven extremely advantageous.

The organic metal compounds may furthermore be used in combination with strongly basic amines. Examples are amidines, such as 2,3-dimethyl-3,4,5,6-tetrahydropyrimidine, tertiary amines, such as triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine, N,N,N',N'-tetramethyldiaminodicyclohexylmethane, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds, such as triethanolamine, triisopropanolamine, N-methyl- and N-ethyldiethanolamine and dimethylethanolamine.

Particularly when an excess of polyisocyanate is used, other suitable catalysts are tris(dialkylaminoalkyl)-s-hexahydrotriazines, in particular tris(N,N-dimethylaminopropyl)-s-hexahydrotriazine, tetraalkylammonium hydroxides, eg. tetramethylammonium hydroxide, alkali hydroxides, eg. sodium hydroxide, and alkali metal alcoholates, eg. sodium methylate and potassium isopropylate, alkali metal formates and acetates, eg. potassium formate and potassium acetate, and alkali metal salts of long-chain fatty acids having 10 to 20 carbon atoms and, if required, pendent OH groups. From 0.001 to 5, in particular from 0.05 to 2, % by weight, based on the weight of the component (b), of the catalyst or catalyst combination are preferably used.

f) An essential feature of the present invention is the use of at least one additive (f) selected from the group consisting of homopolymers (f1), copolymers (f2) and copolymers (f3) and the corresponding graft copolymers (f3) or of a mixture of at least 2 of the stated polymers.

Monoethylenically unsaturated monocarboxylic acids, preferably those of 3 to 10 carbon atoms, the alkali metal salts thereof and/or the ammonium salts thereof are suitable for the preparation of the homopolymers (f1), copolymers (f2) and (f3) and graft copolymers (f3). Examples of monoethylenically unsaturated monocarboxylic acids and salts thereof are acrylic acid, methacrylic acid, dimethylacrylic acid, ethylacrylic acid, allylacetic acid and vinylacetic acid and, for example, the sodium, potassiof at least two of th or mixtures of at least two of the stated monomers.

Acrylic acid, methacrylic acid and their alkali metal salts are preferably used.

Examples of suitable monoethylenically unsaturated dicarboxylic acids, preferably those of 4 to 8, in particular 4 to 6, carbon atoms, are maleic acid, fumaric acid, itaconic acid, mesaconic acid, methylenemalonic acid and citraconic acid. The ethylenically unsaturated dicarboxylic acids can be used as free acids or in a form partially or completely neutralized with alkali metal bases, ammonia or amines, for the formation of the homopolymers (f1), copolymers (f2) and (f3) and graft copolymers (f3). Instead of the free acids, it is also possible to use the internal anhydrides thereof, for example maleic anhydride, itaconic anhydride and methylenemalonic anhydride. The following are preferably used as monomers of this type: maleic acid, maleic anhydride, itaconic acid, itaconic anhydride and the sodium, potassium or ammonium salts of maleic acid or itaconic acid. These salts are obtainable, for example, in a simple manner by neutralization of the stated dicarboxylic acids or anhydrides in aqueous solution with sodium hydroxide solution, potassium hydroxide solution or ammonia.

For example, the following may be used as carboxyl-free, monoethylenically unsaturated monomers copolymerizable with the monoethylenically unsaturated mono- and di-carboxylic acids:

olefins, eg. ethylene, propylene, n-butylene, isobutylene and diisobutene, vinyl alkyl ethers, eg. vinyl methyl ether, vinyl ethyl ether, vinyl propyl ether, vinyl isopropyl ether, vinyl butyl ether, vinyl isobutyl ether and vinyl tert-butyl ether, vinylaromatics, eg. styrene and a-methylstyrene, furan and 2-methylfuran, diketene, acrylic and methacrylic acid derivates, for example (meth) acrylamide, (meth) acrylonitrile, alkyl (meth) acrylates, eg. methyl (meth)acrylate, ethyl (meth) acrylate, propyl (meth)acrylate, butyl(meth) acrylate, isobutyl (meth) acrylate and tert-butyl (meth) acrylate, hydroxyalkyl (meth) acrylates, eg. hydroxyethyl (meth) -acrylate, hydroxypropyl (meth) acrylate, hydroxylbutyl (meth)acrylate and hydroxyisobutyl (meth)acrylate, vinylcarboxylates, eg. vinyl formate, vinyl acetate, vinyl butyrate and vinyl pivalate, and other vinyl-containing monomers, eg. N-vinylpyrrolidone, N-vinylcaprolactam, N-vinylformamide, N-vinylacetamide, N-vinylmethylacetamide and N-vinylimidazole.

As described above, the homopolymers (f1) which can be used as additives (f) can be prepared by hompolymerization of monoethylenically unsaturated monocarboxylic acids or their salts and monoethylenically unsaturated dicarboxylic acids, their salts or their anhydrides.

The copolymers (f2) are obtainable by copolymerization of f2i) monoethylenically unsaturated monocarboxylic acids or their salts or monoethylenically unsaturated dicarboxylic acids or their salts or their anhydrides and f2ii) carboxyl-free, monoethylenically unsaturated monomers copolymerizable with (f2i).

The copolymers (f2) may contain up to 80, preferably from 1 to 20, % by weight, based on the total weight, of polymerized units of the carboxyl-free monomers (f2ii).

The copolymers (f3) are obtainable by copolymerization of f3i) monoethylenically unsaturated monocarboxylic acids and/or their salts, f3ii) monoethylenically unsaturated dicarboxylic acids and/or their salts and/or their anhydrides and, if required, f3iii) carboxyl-free, monoethylenically unsaturated monomers copolymerizable with (f3i) and (f3ii).

Although the amounts of the monomers (f3i) and(f3ii) and, if required, (f3iii) can be varied within wide ranges, for example within weight ratios of from 90:10:(0 to 80) to 10:90:(0 to 80), the copolymers (f3) usually used as additives (f) are those which are advantageously prepared by copolymerization of f3i) from 90 to 40, preferably from 50 to 80, % by weight of at least one monoethylenically unsaturated monocarboxylic acid of, preferably, 3 to 10 carbon atoms or its salt, in particular of acrylic acid, methacrylic acid and/or vinylacetic acid and/or their alkali metal salts and/or their ammonium salts, f3ii) from 10 to 60, preferably from 20 to 50, % by weight of at least one monoethylenically unsaturated dicarboxylic acid of 4 to 8, preferably 4 to 6, carbon atoms and/or its salts and/or its internal anhydrides, in particular maleic acid, citraconic acid, itaconic acid and/or its alkali metal or ammonium salts and/or its internal anhydrides and f3iii) from 0 to 20, preferably from 1 to 10, % by weight of at least one carboxyl-free, monoethylenically unsaturated monomer copolymerizable with (f3i) and (f3ii), the percentages by weight being based on the total weight of the monomers, which sums to 100% by weight.

The homopolymers (f1) and copolymers (f2) and (f3) and graft copolymers (f3) usually have molecular weights of from 300 to 5,000,000, preferably from 500 to 1,000,000, molecular weights of from 10,000 to 150,000 being particularly preferred for the copolymers.

The molecular weights of the homopolymers and (graft) copolymers were determined from the sodium salts by the gel permeation chromatography (GPC) method using aqueous eluants. The separation columns were calibrated with sodium polyacrylate mixtures which had a broad molecular weight distribution and whose integral molecular weight distribution curves were determined by GPC laser stray coupling based on the calibration principle of M. I. R. Cantow et al. (J. Polym. Sci., Part A-1, 5, (1967), 1391–1394), the concentration correction proposed there not being used (in this context, cf. R. Brüssau, W. Goetz, W. M achtle and I. Stölting, Characterization of Polyacrylate Samples, published in Tenside Surfactants Detergents, 28, Issue 6 (1991), 396–406).

Particularly used additives (f) are copolymers (f3) which are obtainable by copolymerization of f3i) from 90 to 10, preferably from 55 to 45, % by weight of acrylic acid and/or the alkali metal salts thereof and f3ii) from 10 to 90, preferably from 45 to 55, % by weight of maleic anhydride, maleic acid and/or the alkali metal salts thereof, the percentages being based on the total weight of the monomers, and which advantageously have a molecular weight of from 5000 to 1,000,000, preferably from 10,000 to 150,000.

Other additives (f) which may be used are graft copolymers which are obtainable by free radical copolymerization of monomer mixtures of (f3i), (f3ii) and, if required (f3iii) in the presence of monosaccharides, oligosaccharides, polysaccharides, oxidatively, hydrolytically or enzymatically degraded polysaccharides, oxidized hydrolytically degraded polysaccharides or oxidized enzymatically degraded polysaccharides or chemically modified mono-, oligo- and polysaccharides in a weight ratio of from 95:5 to 20:80.

The homopolymers or (graft) copolymers which may be used according to the invention may contain anhydride groups and/or acid groups and/or may be present in salt form, and the acid groups may be partially or completely neutralized with bases. Preferably used suitable bases are alkali metal hydroxides, eg. potassium hydroxide and preferably sodium hydroxide. However, amines and ammonium may also be used. The solubility of the homopolymers and (graft) copolymers can be improved by the salt formation.

The homopolymers (f1), copolymers (f2) and (f3) and graft copolymers (f3) which may be used as additives (f) can be prepared by the known mass, solution, suspension and graft polymerization methods. Suitable processes for the preparation of the copolymers and graft copolymers are described, for example, in EP-B-0 075 820 (U.S. Pat. No. 5,175,361), EP-B-0 103 254, EP-B-0 106 111 (U.S. Pat. No. 4,725,655), EP-B-0 106 991 and EP-B-0 441 197 (U.S. Pat. No. 5,227,446). The total content of this patent publication is to be regarded as part of the patent description.

The homopolymers and (graft) copolymers which may be used as additives (f) may be employed, for example, in the form of powders, beads or granules having diameters of, for example, up to 5 mm. Pulverulent homopolymers and (graft) cbpolymers, for example those having particle diameters of up to 50 μm, can be obtained, for example, by precipitation polymerization and, after drying, for example in paddle dryers, are present in the form of very fine powders. Powders having a particle diameter of, for example, from 20 to 300 μm can be prepared from aqueous polymer solutions, for example by spray drying in a simple manner, and granules having a diameter of, for example, from 500 μm to 5 mm can be prepared by drying in a fluidized bed. Beads having a particle diameter of, for example, from 100 μm to 1.5 mm can be obtained, for example, by suspension polymerization.

The homopolymers and (graft) copolymers which may be used according to the invention may be essentially anhydrous or may preferably have a water content of, for example, from 0.01 to 15, preferably from 0.5 to 12% by weight, depending on the intended use. For the production of the urethane-containing moldings, they are advantageously used in an amount of from 0.05 to 20, preferably from 1 to 15, % by weight, based on the weight of the relatively high molecular weight compounds (b), depending on their water content. Mixtures of water and at least one additive (f) selected from the group consisting of the homopolymers (f1), copolymers (f2) and (f3) and graft copolymers (f3) have proven suitable as blowing agents for the production of moldings and are preferably used for this purpose.

In addition to the homopolymers and/or (graft) copolymers essential to the invention, other additives (f) may also be concomitantly used for the production of the CFC-free urethane-containing, preferably semirigid and rigid moldings having a cellular core, an integral skin and an essentially pore-free, smooth surface. Examples of other additives (f) are microporous active carbon and/or microporous carbon molecular sieves according to U.S. Pat. No. 5,254,597, crystalline, microporous molecular sieves and/or crystalline silica according to U.S. Pat. No. 5,110,834, amorphous microporous silica according to EP-A-0 513 573, masterbatches of polyhydroxy compounds and ammonium bicarbonate and/or salts of amines and carbon dioxide, surfactants, foam stabilizers, cell regulators, lubricants, mold release agents, fillers, dyes, pigments, flameproofing agents, hydrolysis stabilizers, fungistatic and bacteriostatic substances or mixtures thereof.

Examples of suitable surfactants are compounds which promote homogenization of the starting materials and may also be suitable for regulating the cell structure. Examples are emulsifiers, such as sodium salts of castor oil sulfates or of fatty acids and salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers, such as siloxane/oxyalkylene copolymers and other organopolysiloxanes, oxyethylated alkylphenols, oxyethylated fatty alcohols, liquid paraffins, castor oil esters or ricinoleic esters, Turkey red oil and peanut oil, and cell regulators, such as paraffins, fatty alcohols and dimethylpolysiloxanes. Furthermore, oligomeric polyacrylates having polyoxyalkylene and fluoroalkane radicals as pendent groups are suitable for improving the emulsifying effect in the cell structure and/or stabilizing the foam. The surfactants are usually used in amounts of from 0.01 to 5 parts by weight, based on 100 parts by weight of component (b).

It has proven particularly useful to add, as a lubricant, a ricinoleic polyester having a molecular weight of from 1500 to 3500, preferably from 2000 to 3000, which is advantageously used in an amount of from 0.5 to 10, preferably from 5 to 8, % by weight, based on the weight of component (b) or of components (b) and (c).

Fillers, in particular reinforcing fillers, are to be understood as meaning the conventional organic and inorganic fillers and reinforcing agents known per se. Specific examples are inorganic fillers, such as silicate minerals, for example sheet silicates, such as antigorite, serpentine, hornblende, amphibole, chrisotile, talc, wollastonite, mica and synthetic silicates, eg. magnesium aluminum silicate (Transpafill®); metal oxides, such as kaolin, aluminas, aluminum silicate, titanium oxides and iron oxides, metal salts, such as chalk and barite, and inorganic pigments, such as cadmium sulfide and zinc sulfide. Examples of suitable organic fillers are carbon black, msiamine, rosin, cyclopentadienyl resins and graft polymers.

The following have proven excellent fillers and/or reinforcing materials and are therefore advantageously used: glass beads, short glass fibers, glass mats, surface mats of glass fibers or of plastics fibers, rovings comprising glass or plastics, for example polyesters, polyamides, thermoplastic polyurethanes and aramid, metal fibers and natural fibers, for example cellulose, reeds and sisal. The rovings may also be used in chopped form. The fillers and reinforcing material may be used both individually and in suitable combinations with one another.

The inorganic and organic fillers and/or reinforcing materials may be incorporated in the reaction mixture and, if they are used at all, are advantageously employed in an amount of from 0.5 to 50, preferably from 1 to 40, % by weight, based on the weight of components (a) to (c). Mats and surface mats comprising fibers can be placed in the same amounts in the empty mold.

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis (2-chloroethyl) ethylene diphosphate.

In addition to the abovementioned halogen-substituted phosphates, inorganic flameproofing agents, such as unmodified or modified red phosphorus, expanding graphite, hydrated alumina, antimony trioxide, arsenic oxide, ammonium polyphosphate and calcium sulfate or cyanuric acid derivatives, for example melamine, or mixtures of at least two flameproofing agents, for example expanding graphite and ammonium polyphosphate, ammonium polyphosphates and melamine and, if required, expanding graphite and/or starch, may also be used for flameproofing the moldings produced according to the invention. In general, it has proven advantageous to use from 2 to 50, preferably from 5 to 25, parts by weight of the stated flameproofing agents, proofing agents, or mixtures thereof per 100 parts by weight of components (a) to (c).

Further information about the abovementioned other conventional assistants and additives appears in the technical literature, for example in the monograph by J. H. Saunders and K. C. Frisch, High Polymers, Volume XVI, Polyurethanes, Parts 1 and 2, Interscience Publishers 1962 and 1964, or in Kunststoff-Handbuch, Polyurethane, Volume VII, Carl-Hanser-Verlag, Munich, Vienna, 1st and 2nd Editions, 1966 and 1983.

For the production of the moldings, the organic, unmodified or modified polyisocyanates (a), relatively high molecular weight compounds having at least two reactive hydrogen atoms (b) and, if required, low molecular weight chain extenders and/or crosslinking agents are reacted in amounts such that the ratio 6f the number of equivalents of NCO groups of the polyisocyanates (a) to the sum of the reactive hydrogen atoms of components (b) and, if required, (c) is from 0.85:1 to 1.50:1, preferably from 0.95:1 to 1.15:1, in particular from 0.9:1 to 1.1:1.

The novel, preferably semirigid or rigid moldings containing urethane groups can be produced by the prepolymer process or, preferably by the one shot process with the aid of the low pressure or the high pressure method in closed, advantageously thermostatable molds, for example metallic molds, for example consisting of aluminum, cast iron or steel, or molds consisting of fiber-reinforced polyester or epoxy molding materials. Owing to the good flow and improved processability of the formulations, however, the moldings are produced in particular by means of the reactive injection molding (RIM) method. These procedures are described, for example, by Piechota and Röhr in Integralschaumstoff, Carl-Hanser-Verlag, Munich, Vienna 1975; D. J. Prepelka and J. L. Wharton in Journal of Cellular Plastics, March/April 1975, pages 87 to 98, U. Knipp in Journal of Cellular Plastics, March/April 1973, pages 76 to 84 and in Kunststoff-Handbuch, Volume 7, Polyurethane, 2nd Edition, 1983, pages 333 et seq.

It has proven particularly advantageous to employ the two-component method and to combine components (b), (d), (e), (f) and, if required, (c) to give component (A) and to use the organic polyisocyanates, modified polyisocyanates (a) or mixtures of the stated polyisocyanates and, if required, blowing agent (d) as component (B).

The starting components are mixed at from 15° to 80° C., preferably from 25° to 55° C., and are introduced into the closed mold, if required at superatmospheric pressure. Mixing can be carried out mechanically by means of a stirrer or a stirring screw or under high pressure by the countercurrent injection method. The mold temperature is advantageously from 20° to 120° C., preferably from 30° to 80° C., in particular from 45° to 60° C. The degrees of compaction are from 1.1 to 8.3, preferably 1.8 to 6, in particular from 2.0 to 2.5.

The amount of reaction mixture introduced into the mold is advantageously such that the resulting moldings have an overall density of from 0.06 to 0.6, preferably from 0.15 to 0.3, g/cm³.

The integral foam moldings produced by the novel process are used, for example, in the automotive industry as safety cladding, in the form of sandwich elements for the production of cockpits for motor vehicles, preferably trucks, and other means of transport, in the form of reinforced moldings as supporting elements in the construction of means of transport, for example as bodywork parts, in the leisure industry as sun loungers, in the building industry as window frames and in the furniture and mechanical engineering industries as housing parts.

EXAMPLES

Example 1

A component: mixture which consisted of 8.4 parts by weight of a polyoxypropylene glycol initiated with 1,2-propylene glycol and having an OH number of 56, 39.7 parts by weight of of a polyoxypropylene polyol initiated with ethylenediamine and having an OH number of 480, 5.2 parts by weight of a trimethylolpropane/1,2-propylene oxide adduct having an OH number of 940, 21.0 parts by weight of a solution which contained 42.8 parts by weight of a trimethylolpropane/1,2-propylene oxide adduct having an OH number of 940, 42.8 parts by weight of a polyoxypropylene polyol initiated with glycerol and having an OH number of 570 and 14.4 parts by weight of tertiary butanol, 2.5 parts by weight of a reaction product of oleic acid and triethanolamine, 2.0 parts by weight of a silicone-based foam stabilizer (Tegostab® B 8418 from Goldschmidt AG, Essen), 0.5 part by weight of 1-methylimidazole, 0.7 part by weight of water and 20.0 parts by weight of a masterbatch which contained 50 parts by weight of a polyoxypropylene glycol initiated with 1,2-propylene glycol and having an OH number of 56 and 50 parts by weight of a copolymer having a molecular weight of 50,000 and a water content of 9.8% by weight, obtained by copolymerization of a mixture of 50% by weight sodium maleate and 50% by weight of acrylic acid and subsequent complete neutralization of the resulting copolymer with sodium hydroxide.

B component: mixture of diphenylmethane diisocyanates and polyphenyl polymethylene polyisocyanates (crude MDI) having an NCO content of 31.0% by weight.

100 parts by weight of the A component and 117.73 parts by weight of the B component were mixed at a component temperature of 29° C. in a high-pressure machine of the Puromat®30 type from Elastogran GmbH, Gesch äftsbereich Maschinenbau, Straßlach. The air loading was 22% by volume. The reaction mixture was introduced at 150 bar and at a discharge rate of 250 g/sec. into a metallic mold heated to 55°–60° C. and having the internal dimensions 500×400×10 mm, in an amount such that, after the mold has been closed, degrees of compaction of 2.5, 3.0, 4.0, 5.0 and 6.0 were established. After 4.5 minutes, the resulting sheet-like PU moldings which had a cellular core, compact skin and an extremely glossy surface were removed from the mold. The PU moldings had the following Shore D hardnesses as a function of the degree of compaction.

| Degree of compaction | 2.5 | 3.0 | 4.0 | 5.0 | 6.0 |
|---|---|---|---|---|---|
| Shore D hardness | 42 | 49 | 63 | 70 | 70 |

When the reaction mixture prepared using the Puromat®30 was allowed to expand in an open beaker, the following physical characteristics were measured:
Initiation time [sec]: 9
Friability time [sec]: 25
Rise time [sec]: 38
Bulk density, free-rise foaming [g/l]: 100.

When components A and B were thoroughly mixed with a hand stirrer and the reaction mixture was left to expand in an open beaker, the following physical characteristics were measured:
Initiation time [sec]: 27
Friability time [sec]: 52
Rise time [sec]: 83
Bulk density, free-rise foaming [g/l]: 120.

Example 2

A component: mixture which consisted of
27.8 parts by weight of a polyoxypropylene glycol initiated with 1,2-propylene glycol and having an OH number of 56,
34.2 parts by weight of a polyoxypropylene polyol initiated with ethylenediamine and having an OH number of 480,
12.6 parts by weight of a trimethylolpropane/1,2-propylene oxide adduct having an OH number of 875,
11.5 parts by weight of alkyl epoxystearate (Edenol® B35 from Henkel, Düsseldorf),
3.0 parts by weight of a silicone-based foam stabilizer (Tegostab® B 8418),
0.5 part by weight of water,
0.15 part by weight of 1-methylimidazole and
10.0 parts by weight of a copolymer having a molecular weight of 50,000 and a water content of 9.9% by weight, obtained by copolymerization of a mixture of 50% by weight of sodium maleate and 50% by weight of acrylic acid and subsequent complete neutralization of the resulting copolymer with sodium hydroxide.

B component: similar to Example 1

100 parts by weight of the A component and 100.02 parts by weight of the B component were mixed at a component temperature of 23° C. using an intensive stirrer. The reaction mixture was introduced into a mold which was heated to 40° C. and had the internal dimensions 200×200×40 mm and whose inner surface had been coated with the release agent PUR A1 (from PURA International Hapke GmbH and Co. KG, Norderstedt).

After standing for 3 minutes, the closed mold was opened and the resulting PU sheet was removed from the mold.

The PU sheet had a cellular core, a compact skin and a smooth, very glossy surface. The overall density was 248 g/l.

When the reaction mixture was introduced into an open beaker and left to expand freely there, the following physical characteristics were measured:
Initiation time [sec]: 15
Friability time [sec]: 87
Rise time [sec]: 117
Bulk density, free-rise foaming [g/l]: 130.4.

Example 3

A component: mixture which consisted of
26.2 parts by weight of a polyoxypropylene glycol initiated with 1,2-propylene glycol and having an OH number of 56,
32.3 parts by weight of a polyoxypropylene polyol initiated with ethylenediamine and having an OH number of 480,
11.8 parts by weight of a trimethylolpropane/1,2-propylene oxide adduct having an OH number of 940,
10.8 parts by weight of alkyl epoxystearate (Edenol® B35 from Henkel, Düsseldorf),
3.0 parts by weight of a silicone-based foam stabilizer (Tegostab® B8418),
0.75 part by weight of water,
0.15 part by weight of 1-methylimidazole and
5.0 parts by weight of a copolymer having a molecular weight of 50,000, obtained by copolymerization of a mixture of 50% by weight of sodium maleate and 50% by weight of acrylic acid and subsequent complete neutralization of the resulting copolymer with sodium hydroxide and
10 parts by weight of a solution which contained 42.8 parts by weight of a trimethylolpropane/1,2-propylene oxide adduct having an OH number of 875, 42.8 parts by weight of a polyoxypropylene polyol initiated with glycerol and having an OH number of 570 and 14.4 parts by weight of tertiary butanol.

B component: similar to Example 1

100 parts by weight of the A component and 100.24 parts by weight of the B component were foamed similarly to Example 2 to give a PU molding.

The PU sheet had a cellular core, a compact skin and a smooth, very glossy surface. The overall density was 245 g/l.

When the reaction mixture was introduced into an open beaker and left to expand freely there, the following physical characteristics were measured:
Initiation time [sec]: 15
Friability time [sec]: 95
Rise time [sec]: 127
Bulk density, free-rise foaming [g/l]: 123.8.

Example 4

A component: mixture which consisted of 21.0 parts by weight of a polyoxypropylene glycol initiated with 1,2-propylene glycol and having an OH number of 56,
26.1 parts by weight of a polyoxypropylene polyol initiated with ethylenediamine and having an OH number of 480,
9.4 parts by weight of a trimethylolpropane/1,2-propylene oxide adduct having an OH number of 875,
8.5 parts by weight of alkyl epoxystearate (Edenol® B 35 from Henkel, Düsseldorf),
2.3 parts by weight of a silicone-based foam stabilizer (Tegostab® B 8418),
0.6 part by weight of water,
0.1 part by weight of 1-methylimidazole and
4.0 parts by weight of a copolymer having a molecular weight of 50,000 and a water content of 9.8% by weight, obtained by copolymerization of a mixture of 50% by weight of sodium maleate and 50% by weight of acrylic acid and subsequent complete neutralization of the resulting copolymer with sodium hydroxide and
8.0 parts by weight of a solution which contained 42.8 parts by weight of a trimethylolpropane/1,2-propylene oxide adduct having an OH number of 875, 42.8 parts by weight of a polyoxypropylene polyol initiated with glycerol and having an OH number of 570 and 14.4 parts by weight of tertiary butanol and
20 parts by weight of short glass fibers having a length of 200 µm.

Component B: similar to Example 1

100 parts by weight of the A component and 100.54 parts by Weight of the B component were foamed similarly to Example 2 to give a PU molding.

The PU sheet had a cellular core, a compact skin having a thickness of about 2 mm and a smooth, very glossy surface. The overall density was 258 g/l.

When the reaction mixture was introduced into an open beaker and left to expand freely there, the following physical characteristics were measured:
Initiation time [sec]: 15
Friability time [sec]: 108
Rise time [sec]: 152
Bulk density, free-rise foaming [g/l]: 130.

Example 5

A component: mixture which consisted of
27.8 parts by weight of a polyoxypropylene glycol initiated with 1,2-propylene glycol and having an OH number of 56,
34.2 parts by weight of a polyoxypropylene polyol initiated with ethylenediamine and having an OH number of 480,
12.6 parts by weight of a trimethylolpropane/1,2-propylene oxide adduct having an OH number of 875,
11.5 parts by weight of alkyl epoxystearate (Edenol® B 35 from Henkel, Düsseldorf),
3.0 parts by weight of a silicone-based foam stabilizer (Tegostab® B 8418),
0.75 part by weight of water,
0.15 part by weight of 1-methylimidazole and
10.0 parts by weight of a copolymer having a molecular weight of 50,000 and a water content of 9.8% by weight, obtained by copolymerization of a mixture of 50% by weight of sodium maleate and 50% by weight of acrylic acid and subsequent complete neutralization of the resulting copolymer with sodium hydroxide.

B component: similar to Example 1.

4 layers of glass mats, each weighing 450 g/m², were placed in the mold described in Example 2 and provided with release agent.

Thereafter, 100 parts by weight of the A component and 100.02 parts by weight of the B component were mixed similarly to Example 2 and foamed to give a molding.

The resulting PU molded sheet had a cellular core, a compact skin having a thickness of about 2 mm and an absolutely smooth surface. The overall density was 330 g/l.

When the reaction mixture was introduced into an open beaker in the absence of glass mats and left to expand freely there, the following physical characteristics were measured:
Initiation time [sec]: 15
Friability time [sec]: 95
Rise time [sec]: 90
Bulk density, free-rise foaming [g/l]: 130.

Example 6

A component: mixture which consisted of
27.8 parts by weight of a polyoxypropylene glycol initiated with 1,2-propylene glycol and having an OH number of 56,
34.2 parts by weight of a polyoxypropylene polyol initiated with ethylenediamine and having an OH number of 480,
12.6 parts by weight of trimethylolpropane/1,2-propylene oxide adduct having an OH number of 875,
11.5 parts by weight of alkyl epoxystearate (Edenol® B 35 from Henkel, Düsseldorf),
3.0 parts by weight of a silicone-based foam stabilizer (Tegostab® B 8418),
0.5 part by weight of water,
0.15 part by weight of 1-methylimidazole,
10.0 parts by weight of a copolymer having a molecular weight of 50,000 and a water content of 9.8% by weight, obtained by copolymerization of a mixture of 50% by weight of sodium maleate and 50% by weight of acrylic acid and subsequent complete neutralization of the resulting copolymer with sodium hydroxide and
20 parts by weight of short glass fibers having a length of 200 μm.

B component: similar to Example 1.

100 parts by weight of the A component and 100.02 parts by weight of the B component were foamed similarly to Example 2 to give a PU molding.

The PU sheet had a cellular core and a compact skin having a thickness of about 2 mm. The overall density was 258 g/l.

When the reaction mixture was introduced into an open beaker and left to expand freely there, the following physical characteristics were measured:
Initiation time [sec]: 15
Friability time [sec]: 108
ise time [sec]: 152
Bulk density, free-rise foaming [g/l]: 130.

Example 7

A component: mixture which consisted of
26.2 parts by weight of a polyoxypropylene glycol initiated with 1,2-propylene glycol and having an OH number of 56,
32.3 parts by weight of a polyoxypropylene polyol initiated with ethylenediamine and having an OH number of 480,
11.8 parts by weight of trimethylolpropane/1,2-propylene oxide adduct having an OH number of 875,
10.8 parts by weight of alkyl epoxystearate (Edenol® B 35 from Henkel, Düsseldorf),
3.0 parts by weight of a silicone-based foam stabilizer (Tegostab® B 8418),
0.75 part by weight of water,
0.15 part by weight of 1-methylimidazole and
5.0 parts by weight of a copolymer having a molecular weight of 70,000 and a water content of 9.8% by weight, obtained by copolymerization of a mixture of 30% by weight of sodidmmaleate and 70% by weight of acrylic acid and subsequent complete neutralization of the copolymer with sodium hydroxide and
10.0 parts by weight of a solution which contained 48.0 parts by weight of a trimethylolpropane/1,2-propylene oxide adduct having an OH number of 875, 42.8 parts by weight of a polyoxypropylene polyol initiated with glycerol and having an OH number of 570 and 14.4 parts by weight of tertiary butanol.

B component: similar to Example 1.

100 parts by weight of the A component and 100.24 parts by weight of the B component were foamed similarly to Example 2 to give a PU molding.

The resulting PU sheet had a cellular core, a compact skin having a thickness of about 2 mm and a very smooth, glossy surface. The overall density was 230 g/l.

When the reaction mixture was introduced into an open beaker and left to expand freely there, the following physical characteristics were measured:
Initiation time [sec]: 15
Friability time [sec]: 98
Rise time [sec]: 138
Bulk density, free-rise foaming [g/l]: 100.8.

Example 8

A component: mixture which consisted of
1.2 parts by weight of a polyoxypropylene glycol initiated with glycerol and having an OH number of 400, 22.0 parts by weight of a polyoxypropylene polyol initiated with ethylenediamine and having an OH number of 480, 22.0 parts by weight of an epoxidized fatty ester (Edenol® B33 from Henkel, Düsseldorf), 20.0 parts by weight of a polyoxypropylene (81.5% by weight) polyoxyethylene (18.5% by weight) glycol initiated with 1,2-propylene glycol and having an OH number of 29, 17.5 parts by weight of a trimethylolpropane/1,2-propylene oxide adduct having an OH number of 875, 0.8 part by weight of a silicone-based foam stabilizer (Tegostab® B 8418), 0.75 part by weight of water, 0.70 part by weight of 1-methylimidazole, 5.0 parts by weight of a copolymer having a molecular weight of 50,000 and a water content of 9.8% by weight, obtained by copolymerization of a mixture of 50% by weight of sodium maleate and 50% by weight of acrylic acid and subsequent complete neutralization of the resulting copolymer with sodium hydroxide and 10.0 parts by weight of a solution which contained 48.0 parts by weight of a trimethylolpropane/1,2-propylene oxide adduct having an OH number of 875, 42.8 parts by weight of a polyoxypropylene polyol initiated with glycerol and having an OH number of 570 and 14.4 parts by weight of tertiary butanol.

B component: similar to Example 1.

100 parts by weight of the A component and 100.24 parts by weight of the B component were foamed similarly to Example 2 to give a PU molding.

The resulting PU sheet had a cellular core, a compact skin having a thickness of about 2 mm and an absolutely smooth surface. The overall density was 224.3 g/l.

When the reaction mixture was introduced into an open beaker and left to expand freely there, the following physical characteristics were measured:

Initiation time [sec]: 15
Friability time [sec]: 98
Rise time [sec]: 138
Bulk density, free-rise foaming [g/l]: 100.8.

Example 9

A component: mixture which consisted of 2.75 parts by weight of a polyoxypropylene polyol initiated with glycerol and having an OH number of 400, 22.0 parts by weight of a polyoxypropylene polyol initiated with ethylenediamine and having an OH number of 480, 22.0 parts by weight of an epoxidized fatty ester (Edenol® B33 from Henkel, Düsseldorf), 20.0 parts by weight of a polyoxypropylene glycol having an OH number of 56, 16.0 parts by weight of a trimethylolpropane/1,2-propylene oxide adduct having an OH number of 875, 0.8 part by weight of a silicone-based foam stabilizer (Tegostab® B 8418), 0.75 part by weight of water, 0.70 part by weight of 1-methylimidazole, 5.0 parts by weight of a copolymer having a molecular weight of 50,000 and a water content of 9.8% by weight, obtained by copolymerization of a mixture of 50% by weight of sodium maleate and 50% by weight of acrylic acid and subsequent complete neutralization of the resulting copolymer with sodium hydroxide and 10.0 parts by weight of a solution which contained 48.0 parts by weight of a trimethylolpropane/1,2-propylene oxide adduct having an OH number of 875, 42.8 parts by weight of a polyoxypropylene polyol initiated with glycerol and having an OH number of 570 and 14.4 parts by weight of tertiary butanol.

B component: similar to Example 1

100 parts by weight of the A component and 100.24 parts by weight of the B component were foamed similarly to Example 2 to give a PU molding.

The resulting PU sheet had a cellular core, a compact skin having a thickness of about 2 mm and an absolutely smooth surface. The overall density was 233.1 g/l.

When the reaction mixture was introduced into an open beaker and left to expand freely there, the following physical characteristics were measured:

Initiation time [sec]: 15
Friability time [sec]: 98
Rise time [sec]: 138
Bulk density, free-rise foaming [g/l]: 110.

Example 10

A component: mixture which consisted of 2.75 parts by weight of a polyoxypropylene polyol initiated with glycerol and having an OH number of 400, 22.0 parts by weight of a polyoxypropylene polyol initiated with ethylenediamine and having an OH number of 480, 22.0 parts by weight of an epoxidized fatty ester (Edenol® B33 from Henkel, Düsseldorf), 20.0 parts by weight of a polyoxytetramethylene glycol having an OH number of 56, 16.0 parts by weight of a trimethylolpropane/1,2-propylene oxide adduct having an OH number of 875, 0.8 part by weight of a silicone-based foam stabilizer (Tegostab® B 8418), 0.70 part by weight of 1-methylimidazole, 5.0 parts by weight of a copolymer having a molecular weight of 50,000, obtained by copolymerization of a mixture of 50% by weight of sodium maleate and 50% by weight of acrylic acid and subsequent complete neutralization of the resulting copolymer with sodium hydroxide and 10.0 parts by weight of a solution which contained 48.0 parts by weight of a trimethylolpropane/1,2-propylene oxide adduct having an OH number of 875, 42.8 parts by weight of a polyoxypropylene polyol initiated with glycerol and having an OH number of 875 and 14.4 parts by weight of tertiary butanol.

B component: similar to Example 1

100 parts by weight of the A component and 100.24 parts by weight of the B component were foamed similarly to Example 2 to give a PU molding.

The resulting PU sheet had a cellular core, a compact skin and a smooth surface. The overall density was 732 g/l.

When the reaction mixture was introduced into an open Deaker and left to expand freely there, the following physical characteristics were measured:

Initiation time [sec]: 15
Friability time [sec]: 98
Rise time [sec]: 110
Bulk density, free-rise foaming [g/l]: 110.

Example 11

A component: mixture which consisted of 27.8 parts by weight of a polyoxypropylene glycol initiated with 1,2-propylene glycol and having an OH number of 56, 31.65 parts by weight of a polyoxypropylene polyol initiated with ethylenediamine and having an OH number of 480, 12.6 parts by weight of a trimethylolpropane/1,2-propylene oxide adduct having an OH number of 875, 11.5 parts by weight of alkyl epoxystearate (Edenol® B 35 from Henkel, Düsseldorf), 3.0 parts by weight of a silicone-based foam stabilizer (Tegostab® B 8418), 0.3 part by weight of water, 0.3 part by weight of 1-methylimidazole, 10.0 parts by weight of a copolymer having a molecular weight of 50,000, obtained by copolymerization of a mixture of 50% by weight of sodium maleate and 50% by weight of acrylic acid, based in each case on the total weight of the mixture, and subsequent complete neutralization of the copolymers obtained with sodium hydroxide, and 3 parts by weight of a masterbatch which consisted of 50 parts by weight of a polyoxypropylene glycol initiated from 1,2-propylene glycol and having an OH number of 56 and 50 parts by weight of ammonium bicarbonate.

B component: similar to Example 1

100 parts by weight of the A component and 88.21 parts by weight of the B component were foamed similarly to Example 2 to give a PU molding.

The resulting PU molded sheet had a cellular core, a compact skin having a thickness of about 2 mm and a glossy smooth surface. The overall density of the molding was 221.0 g/l.

When the reaction mixture was introduced into an open beaker and left to expand freely there, the following physical characteristics were measured:

Initiation time [sec]: 38
Friability time [sec]: 85
Rise time [sec]: 122
Bulk density, free-rise foaming [g/l]: 151.

Example 12

A component: mixture which consisted of 26.20 parts by weight of a polyoxypropylene glycol initiated with 1,2-propylene glycol and having an OH number of 56, 40.5 parts by weight of a polyoxypropylene polyol initiated with ethylenediamine and having an OH number of 480, 11.8 parts by weight of a trimethylolpropane/1,2-propylene oxide adduct having an OH number of 875, 10.8 parts by weight of alkyl epoxystearate (Edenol® B 35 from Henkel, Düsseldorf), 3.0 parts by weight of a silicone-based foam stabilizer (Tegostab® B 8418), 1.8 parts by weight of tert-butyl methyl ether, 0.75 part by weight of water, 0.15 part by weight of 1-methylimidazole and 5.0 parts by weight of a copolymer having a molecular weight of 50,000, obtained by copolymerization of a mixture of 50% by weight of sodium maleate and 50% by weight of acrylic acid and subsequent complete neutralization of the resulting copolymer with sodium hydroxide.

B component: similar to Example 1

100 parts by weight of the A component and 93.65 parts by weight of the B component were foamed similarly to Example 2 to give a PU molding.

The resulting PU molded sheet had a cellular core, a highly compacted skin and an extremely glossy surface. The overall density of the molding was 254 g/l.

When the reaction mixture was introduced into an open beaker and left to expand freely there, the following physical characteristics were measured:

Initiation time [sec]: 15
Friability time [sec]: 73
Rise time [sec]: 111
Bulk density, free-rise foaming [g/l]: 124.

Example 13

A component: mixture which consisted of 26.20 parts by weight of a polyoxypropylene glycol initiated with 1,2-propylene glycol and having an OH number of 56, 41.6 parts by weight of a polyoxypropylene polyol initiated with ethylenediamine and having an OH number of 480, 11.8 parts by weight of a trimethylolpropane/1,2-propylene oxide adduct having an OH number of 875, 10.8 parts by weight of alkyl epoxystearate (Edenol® B 35 from Henkel, Düsseldorf), 3.0 parts by weight of a silicone-based foam stabilizer (Tegostab® B 8418), 0.75 part by weight of water, 0.70 part by weight of n-pentane, 0.15 part by weight of 1-methylimidazole and 5.0 parts by weight of a copolymer having a molecular weight of 50,000, obtained by copolymerization of a mixture of 50% by weight of sodium maleate and 50% by weight of acrylic acid and subsequent complete neutralization of the resulting copolymer with sodium hydroxide.

B component: similar to Example 1

100 parts by weight of the A component and 95.03 parts by weight of the B component were foamed similarly to Example 2 to give a PU molding.

The resulting PU molded sheet had a cellular core, a compact skin and a smooth surface. Compared with the PU moldings expanded using tertiary butanol or tert-butyl methyl ether in combination with water as the blowing agent, the surface gloss was slightly less pronounced. The overall density of the molding was 253 g/l.

When the reaction mixture was introduced into an open beaker and left to expand freely there, the following physical characteristics were measured:

Initiation time [sec]: 15
Friability time [sec]: 71
Rise time [sec]: 107
Bulk density, free-rise foaming [g/l]: 120.

Example 14

A component: mixture which consisted of 26.2 parts by weight of a polyoxypropylene glycol initiated with 1,2-propylene glycol and having an OH number of 56, 32.3 parts by weight of a polyoxypropylene polyol initiated with ethylenediamine and having an OH number of 480, 11.8 parts by weight of a trimethylolpropane/1,2-propylene oxide adduct having an OH number of 875, 10.8 parts by weight of alkyl epoxystearate (Edenol® B 35 from Henkel, Düsseldorf), 3.0 parts by weight of a silicone-based foam stabilizer (Tegostab® B 8418), 0.75 part by weight of water, 0.15 part by weight of 1-methylimidazole and 5.0 parts by weight of a copolymer having a molecular weight of 12,000 and a water content of 9.3% by weight, obtained by copolymerization of a mixture of 46.6% by weight of maleic anhydride and 53.4% by weight of diisobutylene and subsequent neutralization of 75% of the anhydride groups with sodium hydroxide, and 10.0 parts by weight of a solution which contained 48.0 parts by weight of a trimethylolpropane/1,2-propylene oxide adduct having an OH number of 875, 42.8 parts by weight of a polyoxypropylene polyol initiated with glycerol and having an OH number of 570 and 14.4 parts by weight of tertiary butanol.

B component: similar to Example 1.

100 parts by weight of the A component and 100.24 parts by weight of the B component were foamed similarly to Example 2 to give a PU molding.

The resulting PU sheet had a cellular core, a compact skin having a thickness of about 2 ram and very smooth surface. The overall density was 255 g/l.

When the reaction mixture was introduced into an open beaker and left to expand freely there, the following physical characteristics were measured:
Initiation time [sec]: 15
Friability time [sec]: 92
Rise time [sec]: 124
Bulk density, free-rise foaming [g/l]: 120.

Example 15

A component: mixture which consisted of
27.8 parts by weight of a polyoxypropylene glycol initiated with 1,2-propylene glycol and having an OH number of 56,
34.2 parts by weight of a polyoxypropylene polyol initiated with ethylenediamine and having an OH number of 480,
12.6 parts by weight of a trimethylolpropane/1,2-propylene oxide adduct having an OH number of 875,
11.5 parts by weight of alkyl epoxystearate (Edenol® B 35 from Henkel, Düsseldorf),
3.0 parts by weight of a silicone-based foam stabilizer (Tegostab® B 8418),
0.75 part by weight of water,
0.15 part by weight of 1-methylimidazole and
10.0 parts by weight of a copolymer having a molecular weight of 12,000 and a water content of 9.3% by weight, obtained by copolymerization of a mixture of 46.6 parts by weight of maleic anhydride and 53.4 parts by weight of diisobutylene and subsequent neutralization of 75% of the anhydride groups with sodium hydroxide.

B component: similar to Example 1.

100 parts by weight of the A component and 100.02 parts by weight of the B component were foamed similarly to Example 2 to give a PU molding.

The resulting PU molding sheet had a cellular core, a compact skin with a thickness of about 2 mm and a very smooth surface. The overall density of the molding was 255 g/l.

When the reaction mixture was introduced into an open beaker and left to expand freely there, the following physical characteristics were measured:
Initiation time [sec]: 35
Friability time [sec]: 80
Rise time [sec]: 120
Bulk density, free-rise foaming [g/l]: 138.

Example 16

A component: mixture which consisted of
27.8 parts by weight of a polyoxypropylene glycol initiated with 1,2-propylene glycol and having an OH number of 56,
34.2 parts by weight of a polyoxypropylene polyol initiated with ethylenediamine and having an OH number of 480,
12.6 parts by weight of a trimethylolpropane/1,2-propylene oxide adduct having an OH number of 875,
11.5 parts by weight of alkyl epoxystearate (Edenol® B 35 from Henkel, Düsseldorf),
3.0 parts by weight of a silicone-based foam stabilizer (Tegostab® B 8418),
0.75 part by weight of water,
0.15 part by weight of 1-methylimidazole and
10.0 parts by weight of a copolymer having a molecular weight of 12,000 and a water content of 5.7% by weight, obtained by copolymerization of a mixture of 46.6 parts by weight of maleic anhydride and 53.4 parts by weight of diisobutylene.

B component: similar to Example 1.

100 parts by weight of the A component and 100.02 parts by weight of the B component were foamed similarly to Example 2 to give a PU molding.

The resulting PU molding sheet had a cellular core, a compact skin with a thickness of about 2 mm and a glossy, smooth surface. The overall density of the molding was 255 g/l.

When the reaction mixture was introduced into an open beaker and left to expand freely there, the following physical characteristics were measured:
Initiation time [sec]: 36
Friability time [sec]: 82
Rise time [sec]: 117
Bulk density, free-rise foaming [g/l]: 132.7.

Example 17

A component: mixture which consisted of
27.8 parts by weight of a polyoxypropylene glycol initiated with 1,2-propylene glycol and having an OH number of 56,
34.2 parts by weight of a polyoxypropylene polyol initiated with ethylenediamine and having an OH number of 480,
12.6 parts by weight of a trimethylolpropane/1,2-propylene oxide adduct having an OH number of 875,
11.5 parts by weight of alkyl epoxystearate (Edenol® B 35 from Henkel, Düsseldorf),
3.0 parts by weight of a silicone-based foam stabilizer (Tegostab® B 8418),
0.75 part by weight of water,
0.15 part by weight of 1-methylimidazole and
10.0 parts by weight of an oligomaleic acid having a molecular weight of 1200 and a water content of 6.3% by weight.

B component: similar to Example 1.

100 parts by weight of the A component and 100.02 parts by weight of the B component were foamed similarly to Example 2 to give a PU molding.

The resulting PU molding sheet had a cellular core, a compact skin with a thickness of about 2 mm and a smooth surface. The overall density of the molding was 255 g/l.

When the reaction mixture was introduced into an open beaker and left to expand freely there, the following physical characteristics were measured:
Initiation time [sec]: 35
Friability time [sec]: 80
Rise time [sec]: 117
Bulk density, free-rise foaming [g/l]: 126.7.

We claim:

1. A process for the production of chlorofluorocarbon-free urethane-containing moldings having a cellular core and an integral skin comprising reacting
   a. organic polyisocyanates, modified organic polyisocyanates or mixtures of organic and modified organic polyisocyanates with
   b. at least one compound having at least two reactive hydrogen atoms and, optionally,
   c. chain extenders, crosslinking agents or mixtures of chain extenders and crosslinking agents, in the presence of
- d. blowing agents
- e. catalysts and
- f. at least one additive in a closed mold with compaction, wherein the additive (f) comprises: copolymers which are partially or completely neutralized and are obtained by copolymerization or graft copolymerization of

- f1) monoethylenically unsaturated monocarboxylic acids or their salts,
- f2) monoethylenically unsaturated dicarboxylic acids, their salts or their internal anhydrides, and
- f3) optionally, carboxyl-free, monoethylenically unsaturated monomers copolymerizable with f1) and f2).

2. The process as claimed in claim 1, wherein the additive (f) used is a copolymer obtained by copolymerization of

- f3i) from 90 to 40% by weight of at least one monoethylenically unsaturated monocarboxylic acid of 3 to 10 carbon atoms or its salt,
- f3ii) from 10 to 60% by weight of at least one monoethylenically unsaturated dicarboxylic acid of 4 to 8 carbon atoms, its salt or its internal anhydride and
- f3iii) from 0 to 20% by weight of at least one carboxyl-free, monoethylenically unsaturated monomer copolymerizable with (f3i) and f3ii), the percentages being based on the total weight of the monomers.

3. The process as claimed in claim 1, wherein the additive (f) used is a copolymer obtained by copolymerization of

- f3i) from 90 to 40% by weight of acrylic acid, methacrylic acid or vinylacetic acid or their alkali metal or ammonium salts or mixtures thereof,
- f3ii) from 10 to 60% by weight of maleic acid, citraconic acid, itaconic acid or their alkali metal or ammonium salts or their internal anhydrides or mixtures thereof and
- f3iii) from 0 to 20% by weight of at least one carboxyl-free, monoethylenically unsaturated monomer copolymerizable with (f3i) and (f3ii), the percentages being based on the total weight of the monomers.

4. The process as claimed in claim 1, wherein the additive (f) used is a copolymer obtained by copolymerization of

- f3i) from 90 to 10% by weight of acrylic acid or the alkali metal salts thereof and
- f3ii) from 10 to 90% by weight of maleic anhydride, maleic acid, the alkali metal salts thereof or mixtures thereof, the percentages being based on the total weight of the monomers.

5. The process as claimed in any of claims 1 or 2–4, wherein the additive selected from the group consisting of copolymers or (graft) copolymers is used in an amount of from 0.05 to 20% by weight, based on the weight of the compounds (b).

6. The process as claimed in any of claims 1 or 2–4, wherein the polyhydroxy compounds having a functionality of from 2 to 8 are used as the compounds(b).

7. The process as claimed in any of claims 1 or 2–4, wherein the polyhydroxy compounds having a functionality of from 2 to 8 and a molecular weight of from 400 to 8500 are used as the compounds (b) and wherein the additive selected from the group consisting of copolymers or (graft) copolymers is used in an amount of from 0.05 to 20% by weight, based on the weight of the compounds (b).

8. The process as claimed in any of claims 1 or 2–4, wherein a mixture of polyhydroxy compounds having a molecular weight of from 400 to 8500, which contains at least one difunctional polyhydroxy compound, is used as the compounds (b).

9. The process as claimed in any of claims 1 or 2–4, wherein (1) the compound(b) is a mixture of polyhydroxy compounds having a functionality of from 2 to 8 and a molecular weight of from 400 to 8500, the mixture containing at least one difunctional compound and (2) wherein the additive (f) is selected from the group consistency of copolymers or (graft) copolymers and is used in an amount of from 0.05 to 20% by weight, based on the weight of the compounds(b).

10. The process as claimed in any of claims 1 or 2–4, wherein the blowing agent (d) used is water.

11. The process as claimed in any of claims 1 or 2–4, wherein the blowing agent used is a mixture of water and at least one additive (f) selected from the group consisting of the copolymers and (graft) copolymers.

12. A molding made according to the process of any of claims 1 or 2–4.

13. A molding as claimed in claim 12 having an overall density of at least about 0.06 g/cm$^3$.

* * * * *